US012579111B2

(12) United States Patent (10) Patent No.: US 12,579,111 B2
Ong et al. (45) Date of Patent: Mar. 17, 2026

(54) CROSS-DOMAIN STRUCTURAL MAPPING IN MACHINE LEARNING PROCESSING

(71) Applicant: International Business Machines Corporation, Armonk, NY (US)

(72) Inventors: Yuya Jeremy Ong, San Jose, CA (US); Eric Kevin Butler, San Jose, CA (US); Robert Engel, San Francisco, CA (US); German H Flores, Carmichael, CA (US); Aly Megahed, San Jose, CA (US); Nitin Ramchandani, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 979 days.

(21) Appl. No.: 17/139,190

(22) Filed: Dec. 31, 2020

(65) Prior Publication Data

US 2022/0207001 A1 Jun. 30, 2022

(51) Int. Cl.
*G06N 3/08* (2023.01)
*G06F 16/21* (2019.01)
(Continued)

(52) U.S. Cl.
CPC .......... *G06F 16/211* (2019.01); *G06N 3/042* (2023.01); *G06N 3/045* (2023.01); *G06N 3/08* (2013.01)

(58) Field of Classification Search
CPC ...... G06F 16/211; G06N 3/042; G06N 3/045; G06N 3/08
See application file for complete search history.

(56) References Cited

U.S. PATENT DOCUMENTS 6,230,155 B1 5/2001 Broder
8,868,405 B2 10/2014 Kasravi
(Continued)

FOREIGN PATENT DOCUMENTS

CN 108009225 A 5/2018
CN 110032646 A 7/2019
(Continued)

OTHER PUBLICATIONS

Khrulkov et al., Geometry Score: A Method For Comparing Generative Adversarial Networks, Jun. 2018. (Year: 2018).*
(Continued)

*Primary Examiner* — Marshall L Werner
(74) *Attorney, Agent, or Firm* — Seed Intellectual Property Law Group LLP

(57) ABSTRACT

A method of using a computing device executing to interrelate two or more corpuses of dissimilar data that includes receiving input data from each of two or more corpuses of dissimilar data. The computing device computes a pass for each of the input data into two or more encoder-decoder models. The computing device further obtains a prediction of an identity mapping for each of different domains of knowledge from each of the two or more encoder-decoder models. The computing device additionally computes a distribution distance metric as an output from each of a low-dimensional embedding vector representation from each of the two or more encoder-decoder models. The computing device still further computes a function based on each of the predictions from each of the two or more encoder-decoder models and the distribution distance metrics. The computing device additionally updates the two or more encoder-decoder models.

20 Claims, 8 Drawing Sheets

900

(51) Int. Cl.
G06N 3/042 (2023.01)
G06N 3/045 (2023.01)

(56) References Cited

U.S. PATENT DOCUMENTS

| | | | |
|---|---|---|---|
| 9,104,710 | B2 | 8/2015 | Brown |
| 9,323,827 | B2 | 4/2016 | Schilit |
| 10,120,930 | B2 | 11/2018 | Deshpande |
| 2005/0165600 | A1 | 7/2005 | Kasravi et al. |
| 2008/0102855 | A1 | 5/2008 | Forbes et al. |
| 2009/0055394 | A1 | 2/2009 | Schilit et al. |
| 2014/0280183 | A1 | 9/2014 | Brown et al. |
| 2015/0242407 | A1 | 8/2015 | Frohock |
| 2015/0310096 | A1 | 10/2015 | Bao |
| 2017/0075898 | A1 | 3/2017 | Deshpande et al. |
| 2017/0116203 | A1 | 4/2017 | Lightner |
| 2019/0318040 | A1 | 10/2019 | Chaudhury et al. |

FOREIGN PATENT DOCUMENTS

| | | |
|---|---|---|
| CN | 110289986 A | 9/2019 |
| CN | 110390401 A | 10/2019 |
| CN | 114764638 A | 7/2022 |
| DE | 102021131413.5 T5 | 6/2022 |
| GB | 2604012 A | 8/2022 |
| JP | 2021-526259 A | 9/2021 |
| JP | 2022-105289 A | 7/2022 |
| WO | 2019/231624 A2 | 12/2019 |

OTHER PUBLICATIONS

Lin et al., Multisource I-Vectors Domain Adaptation Using Maximum Mean Discrepancy Based Autoencoders, IEEE/ACM Transactions on Audio, Speech, and Language Processing, vol. 26 No. 12, Dec. 2018. (Year: 2018).*
Sumi et al., Modality Conversion of Handwritten Patterns by Cross Variational Autoencoders, Jun. 2019. (Year: 2019).*
Xu et al., Learning Autoencoders with Relational Regularization, Feb. 2020. (Year: 2020).*
Response to United Kingdom Examination Report filed Jun. 13, 2022 for UK Patent Application No. GB2117766.2 submitted to the UK Intellectual Property Office (IPO), pp. 1-3, Sevenoaks, United Kingdom.
United Kingdom Examination Report dated Jun. 9, 2022 for UK Patent Application No. GB2117766.2 from Intellectual Patent Office (IPO), pp. 1-5, South Wales, United Kingdom.
United Kingdom Examination Report dated Jul. 26, 2022 for UK Patent Application No. GB2117766.2 from Intellectual Patent Office (IPO), pp. 1-4, South Wales, United Kingdom.
United Kingdom Examination Report Response filed Sep. 26, 2022 in UK Patent Application No. GB2117766.2, pp. 1-4, South Wales, United Kingdom.
United Kingdom Examination Report dated Oct. 19, 2022 in UK Patent Application No. GB2117766.2, pp. 1-4, South Wales, United Kingdom.
Mell et al., "The NIST Definition of Cloud Computing," National Institute of Standards and Technology Special Publication 800-145, Sep. 2011, 7 pages, United States.
Fu, Y, et al., "Self-similarity grouping: A simple unsupervised cross domain adaptation approach for person re-identification." Proceedings of the IEEE International Conference on Computer Vision. 2019, pp. 6112-6121, IEEE, United States.
Kang, S., et al. "Semi-supervised learning for cross-domain recommendation to cold-start users." Proceedings of the 28th ACM International Conference on Information and Knowledge Management, Nov. 2019, pp. 1563-1572, ACM, United States {Abstract only}.
Mahajan, S. et al., "Latent Normalizing Flows for Many-to-Many Cross-Domain Mappings." arXiv preprint arXiv:2002.06661, Feb. 16, 2020, pp. 1-15, United States.

Benaim, S. et al., "One-shot unsupervised cross domain translation." Advances in Neural Information Processing Systems. 2018, pp. 2104-2114, United States.
Lin, J., et al. "Learning to transfer: Unsupervised meta domain translation." arXiv preprint arXiv:1906.00181, Jun. 1, 2019, pp. 1-10, United States.
Cohen, T. et al., "Bidirectional one-shot unsupervised domain mapping." Proceedings of the IEEE International Conference on Computer Vision, 2019, pp. 1784-1792, IEEE, United States.
Wang, L., et al. "A State-of-the-Art Review on Image Synthesis With Generative Adversarial Networks." IEEE Access, Mar. 20, 2020, pp. 63514-63537, vol. 8, United States.
Lin, J., et al. "Learning to transfer: Unsupervised meta domain translation." arXiv preprint arXiv:1906.00181, Sep. 10, 2019, pp. 1-10, United States.
Qi, C., et al. "Exploring object relation in mean teacher for cross-domain detection." Proceedings of the IEEE Conference on Computer Vision and Pattern Recognition, 2019, pp. 11457-11466, IEEE, United States.
Chen, L., et al. "Graph Optimal Transport for Cross-Domain Alignment." In International Conference on Machine Learning, arXiv preprint arXiv:2006.14744, Jun. 26, 2020, pp. 1542-1553, United States.
Moor, M., et al. "Topological autoencoders." International Conference on Machine Learning, arXiv preprint arXiv:1906.00722, Jun. 2019, pp. 7045-7054, United States.
Khrulkov, V., "Geometry score: A method for comparing generative adversarial networks." International Conference on Machine Learning, arXiv preprint arXiv:1802.02664, Feb. 7, 2018, pp. 1-9, United States.
Reed, SE., et al., "Deep visual analogy-making." In Advances in neural information processing systems, 2015, pp. 1252-1260, vol. 28, United States.
Medela, A., et al., "Constellation Loss: Improving the efficiency of deep metric learning loss functions for optimal embeddingm" arXiv preprint arXiv:1905.10675, May 25, 2019, pp. 1-11, United States.
Esmaeilil et al., "Structured Disentangled Representations," arXiv preprint arXiv:1804.02086, Dec. 12, 2018, 17 pgs.
Hope et al., "Accelerating Innovation Through Analogy Mining," Proceedings of the 23rd ACM SIGKDD International Conference on Knowledge Discovery and Data Mining, 2017, 9 pgs.
Li et al., "A Structural Representation Learning for Multi-relational Networks," arXiv preprint arXiv:1805.06197, Jun. 8, 2018, 12 pgs.
Liao et al., "Visual Attribute Transfer through Deep Image Analogy," arXiv preprint arXiv:1705.01088, Jun. 6, 2017, 16 pgs.
Ma et al., "Composing Knowledge Graph Embeddings via Word Embeddings," arXiv preprint arXiv:1909.03794, Sep. 9, 2019, 7 pgs.
Reed et al., "Deep Visual Analogy-Making," Advances in neural information processing systems, 2015, 1 pg. (abstract only).
Wu et al., "Google's Neural Machine Translation System: Bridging the Gap between Human and Machine Translation," https://arxiv. org/abs/1609.08144, Oct. 8, 2016, 23 pgs.
Zhou et al., "Analogy Search Engine: Finding Analogies in Cross-Domain Research Papers," arXiv preprint arXiv:1812.06974 (2018), 13 pgs.
Zhu et al., "Unpaired Image-to-Image Translation using Cycle-Consistent Adversarial Networks," Proceedings of the IEEE international conference on computer vision, 10 pgs., 2017.
Japan Patent Office, "Notice of Reasons For Refusal" Apr. 22, 2025, 06 Pages, JP Application No. 2021-206780.
Taichi Sumi, et al., "Online-Offline Transfer of Handwritten Letters Using Shared Latent Space", IEICE Technical Report, vol. 118, No. 404, 2019, 08 pages.
Xu et al., "Learning Autoencoders with Relational Regularization", arXiv:2002.02913v4 [cs.LG], Jun. 26, 2020, 18 pages.
The State Intellectual Property Office of People's Republic of China, "Second Office Action", Jun. 21, 2025, 12 Pages, CN Application No. 202111381967.5.

(56)     References Cited

OTHER PUBLICATIONS

The State Intellectual Property Office of People's Republic of China, "Third Office Action", Aug. 19, 2025, 8 Pages, CN Application No. 202111381967.5.

* cited by examiner

CROSS-DOMAIN STRUCTURAL MAPPING IN MACHINE LEARNING PROCESSING

BACKGROUND

The field of embodiments of the present invention relates to machine learning models and systems for cross-domain structural mapping of various domain entity file types.

Many problems in industry, science and research can be solved through inspiration from other orthogonal domains with separate domain data available through the Internet, private networks, and collections (e.g., documents, images, videos), allowing for cross-domain innovation of designs for solutions to problems in domains that may have similar concepts, but in a different context. The capability scalability of cross-domain innovation, however, requires experts in various domains and a strong synergy in identifying these analogous patterns across different domains, which are both time consuming and expensive.

SUMMARY

Embodiments relate to cross-domain structural mapping machine learning models and systems. One embodiment provides a method of using a computing device executing to interrelate two or more corpuses of dissimilar data that includes receiving input data from each of two or more corpuses of dissimilar data. The computing device computes a pass for each of the input data into two or more encoder-decoder models. The computing device further obtains a prediction of an identity mapping for each of different domains of knowledge from each of the two or more encoder-decoder models. The computing device additionally computes a distribution distance metric as an output from each of a low-dimensional embedding vector representation from each of the two or more encoder-decoder models. The computing device still further computes a function based on each of the predictions from each of the two or more encoder-decoder models and the distribution distance metrics. The computing device additionally updates the two or more encoder-decoder models. The embodiments significantly improve the efficiency of researchers to streamline interdisciplinary source discovery and matching without significant knowledge on other external domains. Some features contribute to the advantage of discovering new assets, extracting and associating various components of documents and mapping them to relevant offerings and other products. Some other features contribute to the advantage of discovering new applications of researcher work in new domains and encourage high utility of their work and assets through reuse in different areas.

One or more of the following features may be included. In some embodiments, the method may further include computing, by the computing device, a corresponding reconstruction loss for each of the two or more encoder-decoder models using the respective prediction and the input data from each of the two or more corpuses of dissimilar data. The computing device may further include extracting a low-dimensional embedding vector of input data representations from each of the two or more encoder-decoder model.

In some embodiments, the method may further include the distribution distance metric is a pairwise mean relative living times (MRLT) distribution distance metric, and the function is a joint loss function.

In one or more embodiments, the method may further include computing, by the computing device, a gradient of a loss from the joint loss function with respect to model parameters for each of the two or more encoder-decoder models.

In some embodiments, the method may additionally include initializing, by the computing device, weights for each of the two or more encoder-decoder models. The computing device further performs preprocessing, transforming and extracting of the input data into a fixed-dimension feature vector. The computing device still further performs feed forward processing for the feedforward pass for each intra-domain sample of the input data into each respective one of the two or more encoder-decoder models. The computing device additionally generates corresponding output predictions for each of the intra-domain samples of the input data using each respective one of the two or more encoder-decoder models. The computing device additionally computes a corresponding loss value with respect to the joint loss function for each of the two or more encoder-decoder models given the intra-domain samples of the input data and the corresponding output predictions.

In one or more embodiments, the method may include computing, by the computing device, the pairwise MRLT distribution distance metrics based on a first relative living times (RLT) matrix and a second RLT matrix between each of the intra-domain samples of the input data and based on using a distance of a distribution between the first RLT matrix and the second RLT matrix.

In some embodiments, the method may further include computing, by the computing device, the pairwise MRLT distribution distance metrics based on a first RLT matrix and a second RLT matrix between each of the intra-domain samples of the input data and based on using a squared loss function between output of the first RLT matrix and the second RLT matrix.

In one or more embodiments, the method may include computing, by the computing device, the pairwise MRLT distribution distance metrics based on a RLT matrix and a second RLT matrix between each of the intra-domain samples of the input data and based on using a Wasserstein distance determination of a distribution the first RLT matrix and the second RLT matrix.

In some embodiments, the method may include that the two or more corpuses of dissimilar data comprise text, images, audio, and other data sources in different domains of knowledge.

These and other features, aspects and advantages of the present embodiments will become understood with reference to the following description, appended claims and accompanying figures.

BRIEF DESCRIPTION OF THE DRAWINGS

FIG. 3A shows a two-dimensional representative example of an entity embedding collection;

FIG. 3B shows a representative example of defining an epsilon (ball radius), according to one embodiment;

DETAILED DESCRIPTION

Figure 1:
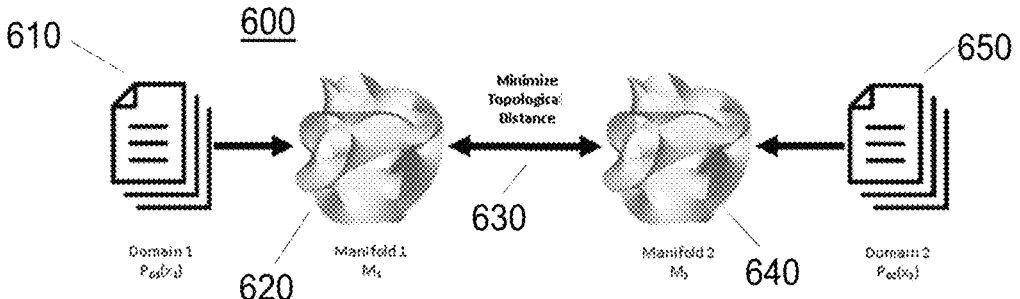
FIG. 1 shows an example of leveraging topological representations for comparison between different representations of domains using defined structures for jointly learning the appropriate mappings between these representations, according to one embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments relate to cross-domain structural mapping machine learning models and systems. One embodiment provides a method of using a computing device executing to interrelate two or more corpuses of dissimilar data that includes receiving input data from each of two or more corpuses of dissimilar data. The computing device computes a pass for each of the input data into two or more encoder-decoder models. The computing device further obtains a prediction of an identity mapping for each of different domains of knowledge from each of the two or more encoder-decoder models. The computing device additionally computes a distribution distance metric as an output from each of a low-dimensional embedding vector representation from each of the two or more encoder-decoder models. The computing device still further computes a function based on each of the predictions from each of the two or more encoder-decoder models and the distribution distance metrics. The computing device additionally updates the two or more encoder-decoder models. One or more of the following features may be included. In some embodiments, the method may further include computing, by the computing device, a corresponding reconstruction loss for each of the two or more encoder-decoder models using the respective prediction and the input data from each of the two or more corpuses of dissimilar data. The computing device may further include extracting a low-dimensional embedding vector of input data representations from each of the two or more encoder-decoder model.

In some embodiments, the method may further include the distribution distance metric is a pairwise mean relative living times (MRLT) distribution distance metric, and the function is a joint loss function.

In one or more embodiments, the method may further include computing, by the computing device, a gradient of a loss from the joint loss function with respect to model parameters for each of the two or more encoder-decoder models.

In some embodiments, the method may additionally include initializing, by the computing device, weights for each of the two or more encoder-decoder models. The computing device further performs preprocessing, transforming and extracting of the input data into a fixed-dimension feature vector. The computing device still further performs feed forward processing for the feedforward pass for each intra-domain sample of the input data into each respective one of the two or more encoder-decoder models. The computing device additionally generates corresponding output predictions for each of the intra-domain samples of the input data using each respective one of the two or more encoder-decoder models. The computing device additionally computes a corresponding loss value with respect to the joint loss function for each of the two or more encoder-decoder models given the intra-domain samples of the input data and the corresponding output predictions. In one or more embodiments, the method may include computing, by the computing device, the pairwise MRLT distribution distance metrics based on a first relative living times (RLT) matrix and a second RLT matrix between each of the intra-domain samples of the input data and based on using a distance of a distribution between the first RLT matrix and the second RLT matrix. In some embodiments, the method may further include computing, by the computing device, the pairwise MRLT distribution distance metrics based on a first RLT matrix and a second RLT matrix between each of the intra-domain samples of the input data and based on using a squared loss function between output of the first RLT matrix and the second RLT matrix. In one or more embodiments, the method may include computing, by the computing device, the pairwise MRLT distribution distance metrics based on a RLT matrix and a second RLT matrix between each of the intra-domain samples of the input data and based on using a Wasserstein distance determination of a distribution the first RLT matrix and the second RLT matrix. In some embodiments, the method may include that the two or more corpuses of dissimilar data comprise text, images, audio, and other data sources in different domains of knowledge.

One or more embodiments include a model (e.g., model architecture 900, FIG. 4) with autoencoders (e.g., autoencoder model 1 920 and autoencoder model 2 925 (FIG. 4)) that employs one or more artificial intelligence (AI) models. AI models may include a trained ML model (e.g., models, such as a neural network (NN), a convolutional NN (CNN), a recurrent NN (RNN), a Long short-term memory (LSTM) based NN, gate recurrent unit (GRU) based RNN, tree-based CNN, a self-attention network (e.g., a NN that utilizes the attention mechanism as the basic building block; self-attention networks have been shown to be effective for sequence modeling tasks, while having no recurrence or convolutions), BiLSTM (bi-directional LSTM), etc.). An artificial NN is an interconnected group of nodes or neurons.

The process of cross-domain mapping stems from the application of lateral thinking, which is a methodology for problem solving using indirect and creative approaches using non-obvious analogy guided thought processes. In some embodiments, examples of applied lateral thinking in innovation include restaurants using a conveyer belt to serve food selections on the conveyor belt, which could be based on an airport luggage carousel via the core concept of object transfer using a conveyor belt. Another example of cross-domain innovation is a game controller as a user interface which could be based on an automotive innovation using a controller for a display to control automotive features via the concept of an intuitive controller. Both of these examples show the principle of similar concepts, but in a different context.

In some embodiments, the following examples of use cases may be approached using cross-domain structural mapping. In one example, given a database of journals from two orthogonal domains, for example neuroscience and AI, suppose one wants to find which subset-pairs of papers are similar to one another. By identifying subset-pairs of papers, in one embodiment cross-domain structural mapping can assist researchers to identify and augment their literature review process by discovering new combinations of ideas between the two domains. The approach of the embodiments significantly improves the efficiency of researchers to streamline interdisciplinary source discovery and matching without significant knowledge on other external domains. As a result, the embodiments significantly improve novel discoveries and connections between two or more different fields, which might have not been easily identifiable by manual work, and can be quickly performed by one or more embodiments.

In tendering processes, clients submit request for proposal (RFP) documents. In each process there are multiple documents, which describe client requirements, a tendering process, logistics, etc. Competitors/bidders, which are services or products providers, need to consume to understand and extract relevant client requirements and bidding information. These competitors/bidders then draft the proposal for the offerings, which fulfill the client requirements based on the information they have extracted. Conventionally, this process is handled manually; where expert knowledge is required, and the process is error prone and labor intensive. There has been some state of the art (SOTA) methods in cognitively extracting requirements from the RFP documents. However, the SOTA methods do not jointly extract from multiple sources and inject requirements into a single response proposal. Some embodiments provide processing for jointly extracting and associating the various components of the RFP documents, and mapping them to the relevant offerings and other products/services (e.g., timeline, delivery method, etc.) that would be included in the RFP document.

In another example, given a collection of business problems or business processes (e.g., a component business model (CBM) portal) and a list of codebase and research assets (e.g., an entity's existing offerings or research assets), some embodiments assist by mapping requirements from clients to existing solutions provided by developers and researchers. The approach of the embodiments significantly improves the discovery of new assets from the client-side (including new use cases of certain solutions). Another improvement benefit is that researchers can discover new applications of their work in new domains and encourage high utility of their work and assets through reuse in different areas.

FIG. 1 shows an example 600 of leveraging topological representations for comparison between different representations of domains using defined structures for jointly learning the appropriate mappings between these representations, according to one embodiment. In some embodiments, to learn and compare the inter-domain structural similarities between various domains, a key component to this entails learning a robust representation that has the following properties: able to estimate the quality and diversity of the representations for each domain; model complex and non-linear structures (relationships between the entities) within each of the entities represented in the domains; and provide a method to compare between two independent domains of entities sets. The example 600 includes a first domain (domain 1 610) $P_{D1}(X_1)$ and a second domain (domain 2 650) $P_{D2}(X_2)$. The domain 1 610 and the domain 2 650 each includes multiple documents.

A manifold is a topological space that is similar to Euclidean space near each point. A topological space may be defined as a set of points, along with a set of neighborhoods for each point, satisfying a set of axioms relating points and neighborhoods. Each point of an n-dimensional manifold has a neighborhood that is homeomorphic to the Euclidean space of dimension n. The dimension of a mathematical space (or object) may be defined as the minimum number of coordinates needed to specify any point within the dimension. Some embodiments make use of the distribution of data $p_{data}(x)$ that is concentrated on a low dimensional manifold $M_{data}$ that assumes: the manifold is a complex non-linear structure; and that novel features and patterns of the data $p_{data}(x)$ can be represented in terms of properties of the manifold—such as loops and higher dimensional holes in $M_{data}$. One embodiment leverages such topological representations, which provides for comparing between different representations of domains using the defined structures, and jointly learning the appropriate mappings between these representations. In the example 600, the domain 1 610 is represented as a Manifold 1 620 ($M_1$) and the domain 2 650 is represented as a Manifold 2 640 ($M_2$). In one embodiment, a cross-domain structural mapping process (as described below) minimizes the topological distance 630 between the manifold 1 620 and the manifold 2 640.

Figure 2:
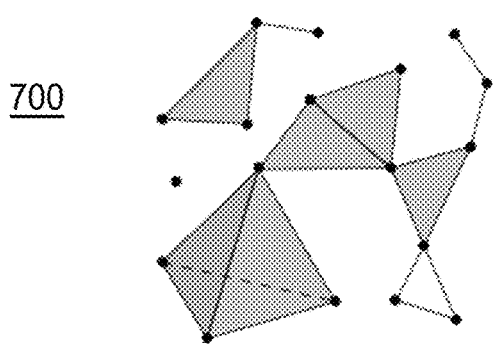
FIG. 2 shows a representative example of a simplicial 3-complex for different and separate components.

FIG. 2 shows a representative example of a simplicial 3-complex 700 for different and separate components. As there is no direct access to the topological representation of the data, one embodiment provides for learning approximated representations of the manifolds based on the sample of the data that exists for each domain. One example embodiment uses simpler representation spaces, such as the simplicial complexes, which are representations constructed by points, line segments, triangles, and higher order tetrahedrons. An n-dimensional simplex is the convex hull of n+1 many affine points. In the example simplicial 3-complex 700, it can be seen that the largest dimension of the simplicial complex is three-dimensional (4 sides), as the tetrahedron has four corners. Therefore, in the example it is considered as a simplicial "3"-complex.

FIG. 3A shows a representative example of an entity embedding collection 810. Using the representation in this example, the cross-domain structural mapping processing considers the relevant connections between the pairwise distances between each of the samples.

FIG. 3B shows a two-dimensional representative example 820 of defining an epsilon (ball radius) 825, according to one embodiment. In defining an epsilon (ball radius), given that one epsilon (ball radius) 825 provides a single simplicial complex, one embodiment considers different ranges of epsilons. In one embodiment, considering a family of simplicial complexes, for each of the different epsilons, the cross-domain structural mapping processing quantifies the characteristics of the simplicial complexes by evaluating emergent features or homologies, such as loops and number of holes. For each different epsilon value, there are a different number of homologies, which controls what relationships are important versus which ones are noisy. In one embodiment, these formed k-homologies (e.g., how many k-dimensional holes exist) are appropriately ranked by looking at a persistence barcode (a graphical representation in bar graph format representation of the components in a simplicial) by observing the intersection of each of the bars in a persistence barcode (where each bar in the persistence barcode represents components in the simplex complex; or groupings of the data).

Figure 3C:
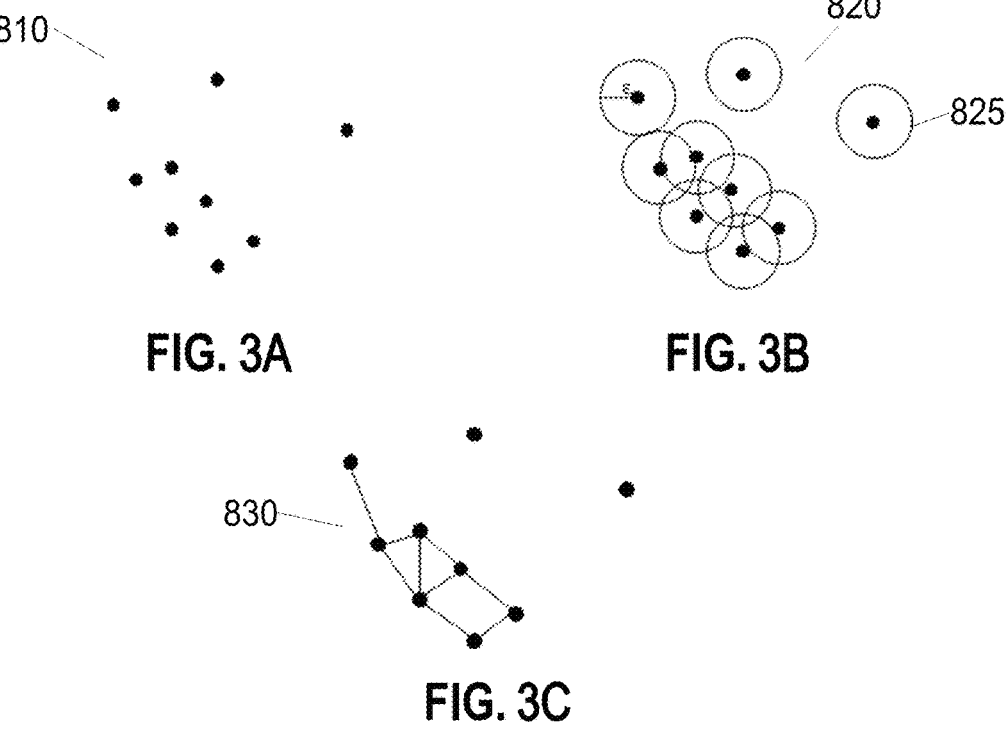
FIG. 3C shows a representative example of a simplicial complex construction using the examples from FIGS. 3A-B, according to one embodiment.

FIG. 3C shows a representative example of a simplicial complex construction 830 using the examples from FIGS. 8A-B, according to one embodiment. In one embodiment, the epsilon parameter is leveraged as a process to determine an optimal ball radius that provides for determining the best simplicial complex (representation of the intra-domain relationships) to perform such mappings across inter-domain relationships. In some embodiments, the persistence barcodes need to be determined in an efficient manner for large datasets and compared between different persistence barcodes (which is non-trivial in many cases). In one embodiment, a small subset of landmark points is used to construct the simplicial complex while taking into consideration proximity points, which are referred to as witnesses. A witness complex is a simplicial complex defined on two sets of points in $\mathbb{R}^D$ (the set of real numbers in D dimensions). Landmark points are vertices of the simplicial complex and witnesses help to decide on which simplices "are witnessed" (observed).

One problem in conventional methodologies is how to learn the representation, which is not clear. Namely, the first step in taking the pairwise distances to learn the relationship between the entities is not scalable and is not well executed, which is suggested conventionally to include an "end-to-end" manner. One conventional approach proposed to compare the quality and diversity of generative adversarial networks (GANs) as generated data versus real data using topological properties of the low-dimensional embedding representation of the data as a comparison between two probability distributions. In one embodiment, the cross-domain structural mapping processing learns a (good) topological representation (which can be represented as a probability distribution); attempting to perform the cross-domain structural mapping over a topological space (instead of the geometrical space); and the persistence barcode representation is used to represent the use of the RLT, which is used as a metric to indicate the number of holes, or equivalently the number of connected components found in the dataset relative to the radius of the ball of the simplex. One or more embodiments contribute to the advantage of use of topological features as part of the cross-domain mapping loss function. In one embodiment, a geometry score is used as part of a joint loss function as opposed to an auxiliary scoring function as used in conventional techniques. Another advantage of one or more embodiments is that processing requires far less samples than conventional techniques, which makes the cross-domain structural mapping processing tractable for large datasets.

Figure 4:
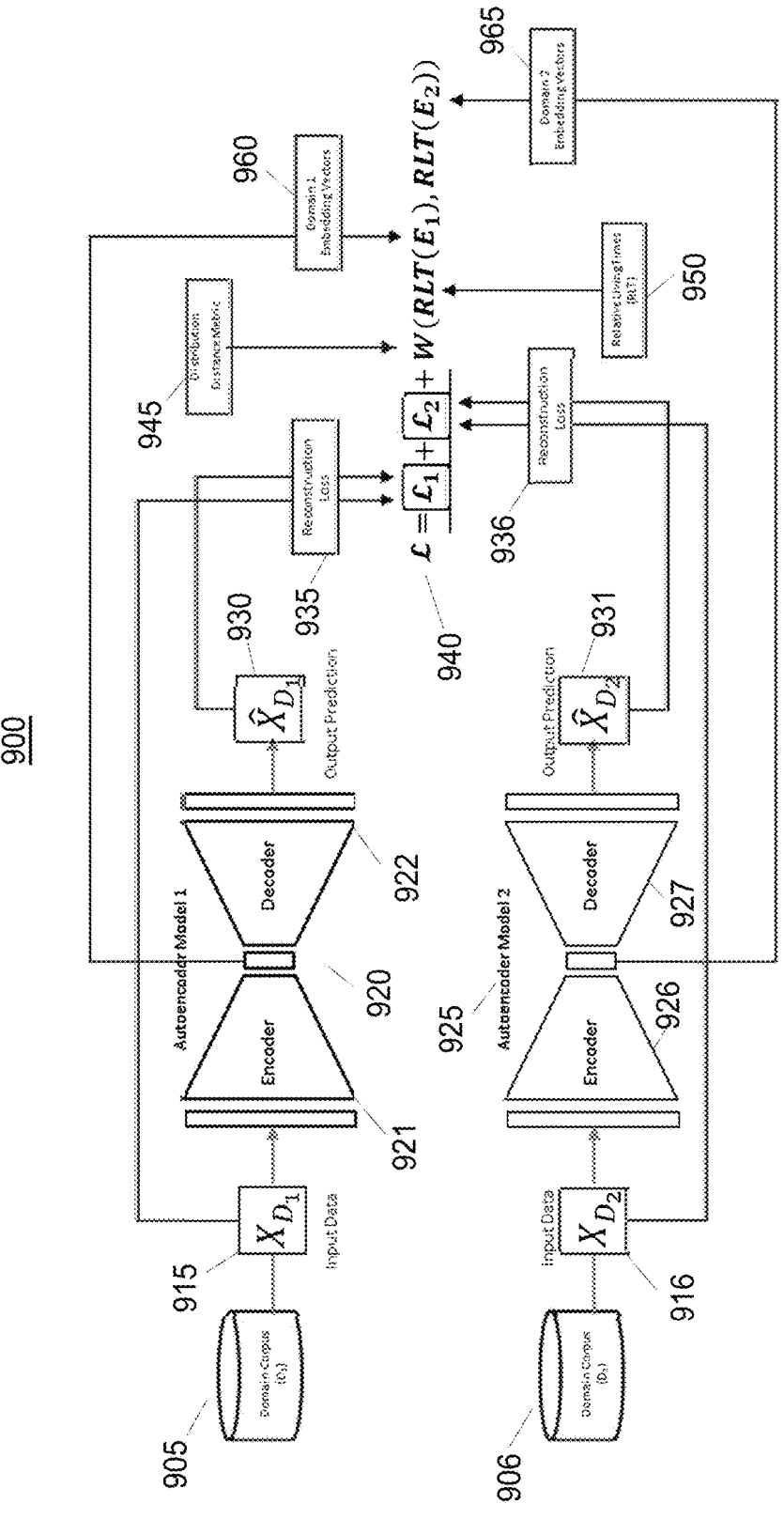
FIG. 4 illustrates a block diagram of a flow for a machine learning model architecture for cross-domain structural mapping, according to one embodiment.

FIG. 4 illustrates a block diagram of a flow for an ML model architecture 900 for cross-domain structural mapping processing, according to one embodiment. In one embodiment, the ML model architecture 900 includes a domain corpus ($D_1$) 905, a domain corpus ($D_2$) 906, input data 915 ($X_{D_1}$), input data 916 ($X_{D_2}$), an autoencoder model 1 920 (with encoder 921 and decoder 922), an autoencoder model 2 925 (with encoder 926 and decoder 927), output prediction 930 ($\hat{X}_{D_1}$), output prediction 931 ($\hat{X}_{D_2}$), reconstruction loss processing 935, reconstruction loss processing 936, loss function processing 940, distribution distance metric processing 945, RLT processing 950, domain 1 embedding vectors processing 960 and domain 2 embedding vectors processing 965. In general, this architecture can be extended up to N sets of corpuses, thus scaling the number of cross domain mappings to be performed across N different corpuses, and N autoencoder models.

In one embodiment, the cross-domain structural mapping processing of the ML model architecture extracts an estimated value for the homologies using the RLT of each of the holes observed in the simplicial complex. The RLT is the ratio of the total time (considering epsilon as a time axis) of how long a homology existed over the maximum epsilon (the point at which the complex turns into a single entity). The RLT may also evaluate the confidence of how well approximated a manifold representation is. To ensure robustness, in one embodiment the RLT is stochastically modeled by considering the average of the RLT or the Mean RLT (MRLT)—by selecting some landmarks or landmark points (based on a scalable complex suitable for large point sets, e.g., the Witness Complex). Through this, a probability distribution for each of the homologies is derived, which can then allow for a comparison across other manifold representations; through measures such as the L2-Error or Wasserstein Distance. In one embodiment, the RLT is used as part of a (parameterized) loss function processing 940 as opposed to an auxiliary metric as used in conventional techniques.

In one embodiment, the RLT processing 950 may be represented as follows:

$$RLT(i, k, X, L) \triangleq \frac{\mu(\{\alpha \in [0, \alpha_{max}]:\beta_k(\alpha) = i\})}{\alpha_{max}}$$

where i is the persistence interval, k is the Kth dimension of the simplicial complex, X is the dataset, L are the landmarks, $\mu$ is the mean computation, $\alpha \in [0,\alpha_{max}]$ are all ranges of epsilon ($\alpha_{max}$ is the upper bound for epsilon), $\beta_k(\alpha)=i$ is the Kth Betti number. Given an alpha ($\alpha$) value, which provides a simplicial complex with a certain homology, the Betti number gives an integer count of persistence intervals containing $\alpha$:

$$\beta_k(\alpha) \triangleq |\{[b_i,d_i] \in \mathcal{J}_k:\alpha \in [b_i,d_i]\}|$$

where b and d respectively represent the starting and ending interval points of a persistence interval, $\mathcal{J}_k = \{[b_i,d_i]\}_{i=1}^n$ represents a collection of n persistence intervals in the kth dimension, and i and k are integers.

In one embodiment, the MRLT is represented as follows:

$$MRLT(i,k,X) \triangleq \mathbb{E}_L[RLT(i,k,X,L)],$$

where $\mathbb{E}_L$ is the expectation of the RLT at a given landmark L. This follows that the MLRT can be defined as a probability distribution as:

$$\sum_i MRLT(i, k, X) = 1.$$

In one embodiment, the input data (input data 915 ($X_{D_1}$), input data 916 ($X_{D_2}$), etc.) may include a collection of N separate sets of domain entities ($D_i$), containing some number of items (e.g., documents, nodes in a graph(s), images, videos, code, etc.). In one embodiment, the output (output prediction 930 ($\hat{X}_{D_1}$), output prediction 931 ($\hat{X}_{D_2}$), etc.) includes a learned transformation function or mapping model between the intra-domain entity vectors across the N domains. The output mapping model may be further used in other embodiments for a transformation function or an index for a search engine. The ML model architecture 900 provides a learned model that maps between the intra-domain structural differences of the entities within each domain corpuses, such that the resulting embedding model can generate an index for any arbitrary cross-domain input.

In one embodiment, the autoencoder model 1 920 and the autoencoder model 2 925 may include four parts: an encoder (e.g., encoder 921 and encoder 926) in which the autoencoder models learn how to reduce the input dimensions and compress the input data into an encoded representation; a bottleneck, which is the layer that contains the compressed representation of the input data (the lowest possible dimensions of the input data): a decoder (e.g., decoder 922, decoder 927), which the model learns how to reconstruct the data from the encoded representation to be as close to the original input as possible; and reconstruction loss (reconstruction loss processing 935, reconstruction loss 936), which is the processing that measures how well the decoder is performing and how close the output is to the original input. The training of the autoencoder model 1 920 and autoencoder 2 925 involves using back propagation in order to minimize the reconstruction loss.

In one embodiment, the autoencoder models (autoencoder model 1 920 and autoencoder model 2 925) may each include an RNN encoder-decoder, including two RNNs that act as an encoder and a decoder pair. The encoder (e.g., encoder 921, encoder 926) maps a variable-length source sequence to a fixed-length vector, and the decoder (e.g., decoder 922, decoder 927) maps the vector representation back to a variable-length target sequence. In some embodiments, the autoencoder models are each an unsupervised artificial NN that learns how to efficiently compress and encode data, and then learns how to reconstruct the data back from the reduced encoded representation to a representation that is as close to the original input as possible.

In one embodiment, processing for the ML model architecture 900 involves computing the feedforward pass for the autoencoder models (autoencoder model 1 920 and autoencoder model 2 925), computing the RLT (RLT processing 950) of latent embeddings, computing the RLT distribution distance loss metric, and computing the joint loss function (loss function processing 940), gradients and update model, as described below.

In one embodiment, computing the feedforward pass for the autoencoder models (autoencoder model 1 920 and autoencoder model 2 925) includes the following. In one embodiment, the input data (input data 915 ($X_{D_1}$), input data 916 ($X_{D_2}$), etc.) includes a collection of N separate sets of domain entities ($D_i$), containing some number of items (e.g., documents, nodes in a graph(s), images, videos, code, etc.). The output for this portion of processing includes the predacted output from the respective (intra-domain) autoencoder models (autoencoder model 1 920 and autoencoder model 2 925) for each of the items in the set D and the corresponding loss value for each of the predictions.

In one embodiment, for the feedforward pass, given a collection of N separate Domain Entities ($D_i$), for each domain the processing first feeds each sample to its respective autoencoder model (autoencoder model 1 920 and autoencoder model 2 925) to generate predictions and correspondingly compute its loss value. In some embodiments, the autoencoder models (autoencoder model 1 920 and autoencoder model 2 925) may be a shallow autoencoder or a seq-to-seq encoder-decoder autoencoder model. With the given prediction, the ML model architecture 900 also computes the corresponding loss value with respect to each of the models defined.

In one embodiment, for the feedforward pass, for each domain's autoencoder model (autoencoder model 1 920 and autoencoder model 2 925), weights are initialized for the corresponding autoencoder model. Next, the input data (input data 915 ($X_{D_1}$), input data 916 ($X_{D_2}$)) are preprocessed, transformed, and data is extracted into some fixed-dimension feature vector. Feed forward processing is performed next for each intra-domain sample into the respective autoencoder models (note that specific implementations for this depend on the embodiment of the ML model used). The corresponding output predictions are generated for each of the samples using the corresponding intra-domain autoencoder model (autoencoder model 1 920 and autoencoder model 2 925). Given the input sample data and the predicted output, the corresponding loss value is computed with respect to the given loss function for that given model.

In one embodiment, the computation of the RLT (RLT processing 950) of latent embeddings computes the RLT for each intra-domain set of embedding vectors, which is later used to compute the distance between the two RLT of the set of intra-domain embedding vectors. In one embodiment, the computation of the RLT of latent embeddings includes the following as input: a set of embedding vector representations, X, for each of the items in the set of D; the number of landmarks, $L_0$, to use; the coefficient, $\gamma$, for determining an upper bound epsilon value ($\alpha_{max}$); the parameter $i_{max}$ for determining an upper bound persistence interval; the number n of iterations; a distance function dist(a, b) that is used to compute the distance between sample a and sample b; a function, witness(d, $\alpha$, k), computing a family witness of complexes of pairwise distances d, maximum value of persistence $\alpha$, and maximal dimension of simplex k; and a function, persistence(w, k), that computes a persistence interval of a family with dimension k. In one embodiment, the computation of the RLT of latent embeddings includes the following as output: a matrix of n by $i_{max}$ that includes the RLT measurements.

In one embodiment, the computation of the RLT of latent embeddings initializes a matrix with dimensions n by $i_{max}$ to store the resulting computation of the RLT. The processing then randomly selects $L_0$ of embedding vector representations from X and assigns that to L. Next, given L and X, the processing computes the given distance function using the defined distance metric dist(L, X) and assigns that as d. The largest epsilon size is computed from $\gamma \cdot \max(dist(L, L))$, which is assigned to $\alpha_{max}$. Given d and $a_{max}$, next the witness of complexes is determined using the witness function, witness(d, $\alpha_{max}$, 2), where k=2 is considered, and the output is assigned to W. Given W, the persistence value is determined by computing persistence(W, 1), which is assigned as I. Using values computed from above, the RLT (using RLT(i, X, L, K)) is determined, and the RLT matrix is populated for each sample and range of epsilons between [0, $i_{max}$].

In one embodiment, for computing the RLT distribution distance loss metric, the input includes the distribution of the RLT matrices from each intra-domain RLT matrix from the different data sources, and the output is a measure that quantifies the distance between the first intra-domain RLT and the second intra-domain RLT. In this portion of processing for the ML model architecture 900, the distances between the two distributions of the MRLT from each intra-domain datasets are determined, which is then used as part of the loss function processing 940 for the ML model architecture 900 processing to minimize.

In one embodiment, computing the RLT distribution distance loss metric includes the following, given the first RLT matrix $RLT(X^{(1)})$ and the second RLT matrix, $RLT(X^{(2)})$, the distance metric between the two intra-domain embedding datasets may be computed. In one embodiment, a Wasserstein Distance is used where processing considers computing the distance of the distribution between $RLT(X^{(1)})$ and $RLT(X^{(2)})$. In an alternate embodiment, a squared loss function between the output of $RLT(X^{(1)})$ and $RLT(X^{(2)})$ is implemented.

In one embodiment, for computing the joint loss function (loss function processing 940), gradients and updating the ML model architecture 900, the input includes the reconstruction loss function from each of the autoencoder models (autoencoder model 1 920 and autoencoder model 2 925), and the distance function from each of the intra-domain embedding vectors' RLT. The output includes the joint loss function from the ML model architecture 900 (from each of the different components), and updated ML model architecture 900 parameters from the backpropagation processing. In this portion of processing for the ML model architecture 900, joint loss function processing 940 is determined from the computations of all the components previously computed, and subsequently Stochastic gradient descent (SGD) processing is performed to update the ML model architecture 900 parameters. The processing jointly optimizes both the reconstruction loss and the loss from the distance of the RLT metrics. SGD processing includes an iterative process for optimizing an objective function with suitable smoothness properties.

In one embodiment, for computing the joint loss function (loss function processing 940), gradients and updating the ML model architecture 900, given each of the loss functions from the reconstruction loss (reconstruction loss processing 935, reconstruction loss processing 936) from the autoencoder models (autoencoder model 1 920 and autoencoder model 2 925) and the distance function between the intra-domain embedding vector RLT, each of the components are added as a single loss value. Next, the processing computes the gradients and performs SGD processing to update the parameters of the ML model architecture 900 with respect to the original encoder-decoder models (autoencoder model 1 920 and autoencoder model 2 925) of the ML model architecture 900.

One or more embodiments may apply the processing of the ML model architecture 900 as an enablement technology to further accelerate and augment research and innovation workflows across a broad spectrum of industries and technologies. The embodiments may enhance and bridge the gap between classical symbolic methods of AI with Deep Learning methods—introducing techniques for advancing the SOTA in hybrid methods.

Figure 5:
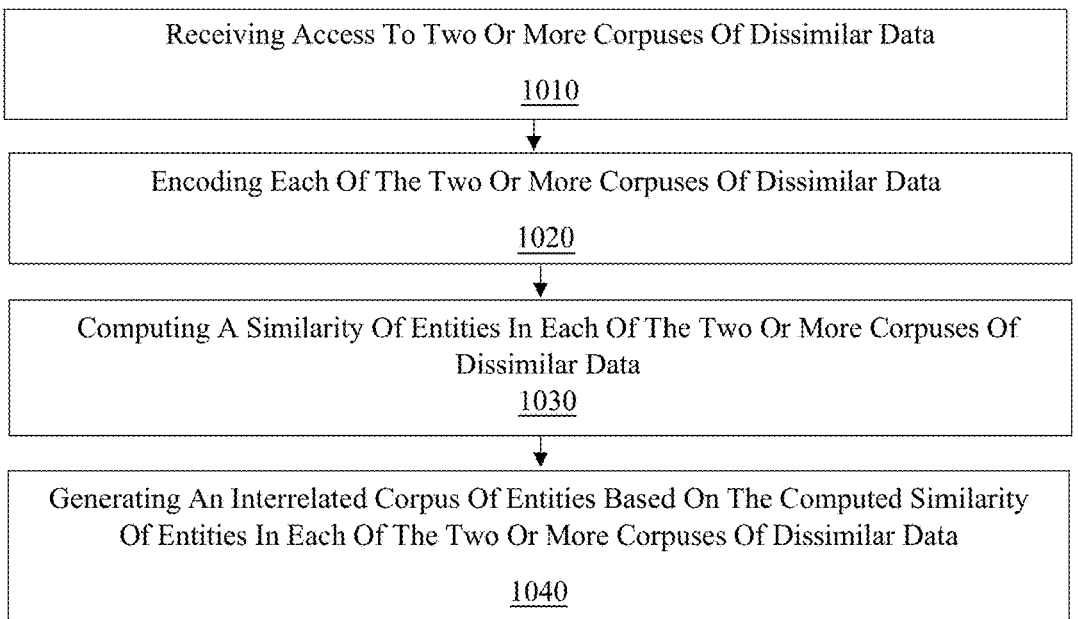
FIG. 5 illustrates a block diagram of a process for cross-domain structural mapping to interrelate two or more corpuses of dissimilar data, according to one embodiment.

FIG. 5 illustrates a block diagram of a process 1000 for cross-domain structural mapping to interrelate two or more corpuses of dissimilar data, according to one embodiment. In one embodiment, in block 1010, process 1000 receives, by a computing device (from computing node 10, FIG. 6, hardware and software layer 60, FIG. 7, processing system 300, FIG. 8, system 400, FIG. 9, system 500, FIG. 10, ML model architecture 900, FIG. 4, etc.) access to two or more corpuses of dissimilar data (e.g., domain corpus $(D_1)$ 905, a domain corpus $(D_2)$ 906, FIG. 4). In block 1020, process 1000 further provides encoding (e.g., using encoder 921 of autoencoder model 1 920, encoder 926 of autoencoder model 2 925, FIG. 4), by the computing device, each of the two or more corpuses of dissimilar data. In block 1030, process 1000 further provides computing, by the computing device, a similarity of entities in each of the two or more corpuses of dissimilar data (e.g., using RLT processing 950, FIG. 4). In block 1040, process 1000 additionally provides generating, by the computing device, an interrelated corpus of entities based on the computed similarity of entities in each of the two or more corpuses of dissimilar data.

In one embodiment, process 1000 may further include the feature that, the two or more corpuses of dissimilar data are scientific journal articles in different domains of knowledge.

In one embodiment, process 1000 may additionally include the feature that receiving input data from each of the two or more corpuses of dissimilar data. The computing device further computes a feedforward pass for each of the input data into two or more encoder-decoder models (e.g., autoencoder model 1 920 and autoencoder model 2 925, FIG. 4). The computing device still further obtains a prediction of an identity mapping for each of the different domains of knowledge from each of the two or more encoder-decoder models. The computing device additionally computes a corresponding reconstruction loss (e.g., reconstruction loss processing 935, and reconstruction loss processing 936, FIG. 4) for each of the two or more encoder-decoder models using the respective prediction (e.g., output prediction 930 $(\hat{X}_{D_1})$, output prediction 931 $(\hat{X}_{D_2})$) and the input data from each of the two or more corpuses of dissimilar data.

In one embodiment, process 1000 may still additionally include the feature of extracting, by the computing device, a low-dimensional embedding vector (e.g., from domain 1 embedding vectors processing 960 and domain 2 embedding vectors processing 965, FIG. 4) of input data representations from each of the two or more encoder-decoder models. The computing device further computes a pairwise MRLT distribution distance metric as an output from each of the low-dimensional embedding vector representations from each of the two or more encoder-decoder models. The computing device still further computes a joint loss function (e.g., via loss function processing 940) based on each of the predictions from each of the two or more encoder-decoder models and the pairwise MRLT distribution distance metrics. The computing device additionally computes a gradient of a loss from the joint loss function with respect to model parameters for each of the two or more encoder-decoder models. The computing device further updates the two or more encoder-decoder models.

In one embodiment, process 1000 may yet additionally include initializing, by the computing device, weights for each of the two or more encoder-decoder models. The computing device further performs preprocessing, transforming and extracting of the input data into a fixed-dimension feature vector. The computing device still further performs feed forward processing for the feedforward pass for each intra-domain sample of the input data into each respective one of the two or more encoder-decoder models. The computing device additionally generates corresponding output predictions (e.g., output prediction 930 $(\hat{X}_{D_1})$, output prediction 931 $(\hat{X}_{D_2})$) for each of the intra-domain samples of the input data using each respective one of the two or more encoder-decoder models. The computing device additionally computes a corresponding loss value with respect to the joint loss function for each of the two or more encoder-decoder models given the intra-domain samples of the input data and the corresponding output predictions.

In one embodiment, process 1000 may further include the feature of computing, by the computing device, the pairwise MRLT distribution distance metrics based on a first RLT matrix and a second RLT matrix between each of the intra-domain samples of the input data and based on using a distance of a distribution between the first RLT matrix and the second RLT matrix.

In one embodiment, process 1000 may still further include the feature of computing, by the computing device, the pairwise MRLT distribution distance metrics based on a first RLT matrix and a second RLT matrix between each of the intra-domain samples of the input data and based on using a squared loss function between output of the first RLT matrix and the second RLT matrix.

It is understood in advance that although this disclosure includes a detailed description of cloud computing, implementation of the teachings recited herein are not limited to a cloud computing environment. Rather, embodiments of the present embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Figure 6:
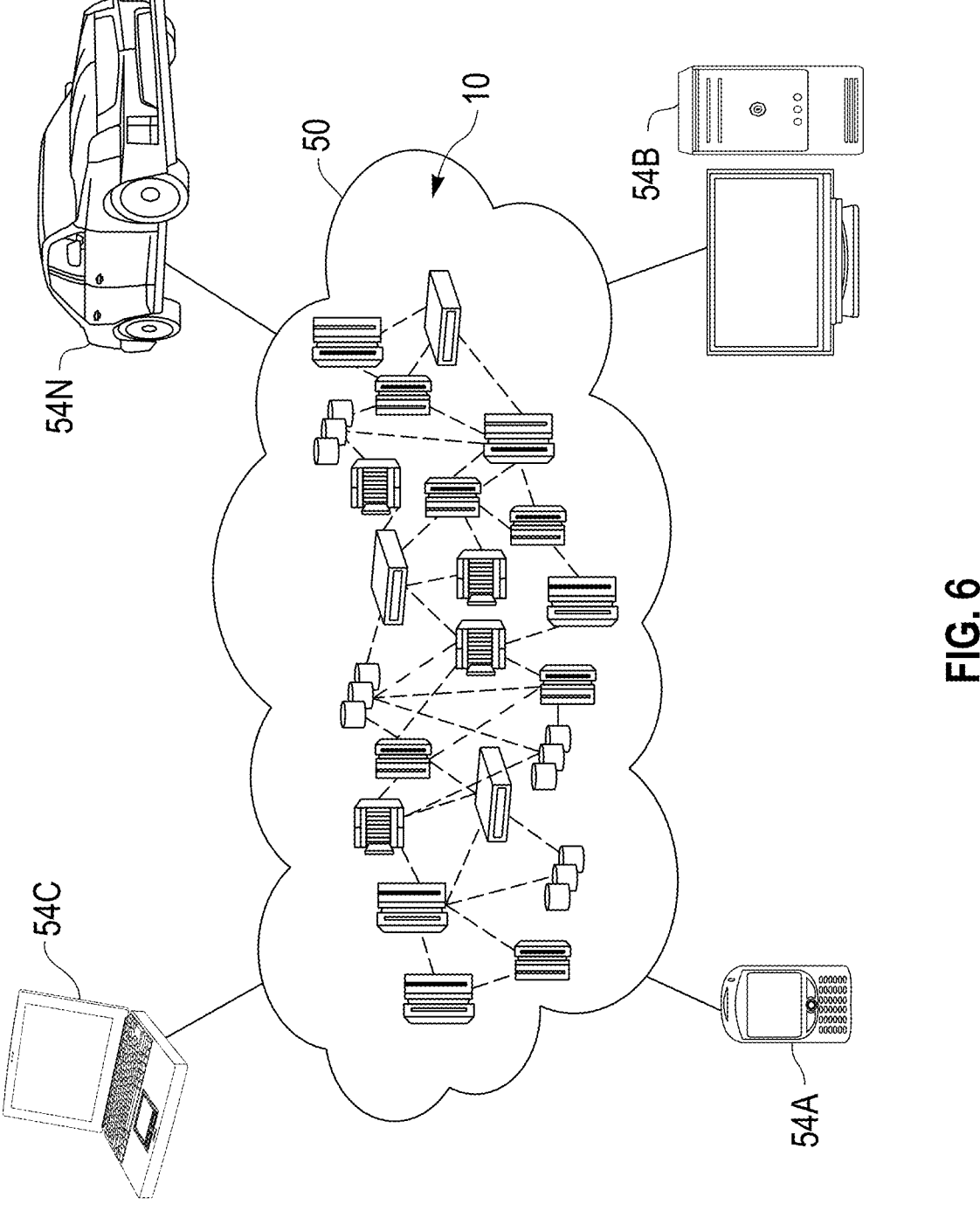
FIG. 6 depicts a cloud computing environment, according to an embodiment.

Referring now to FIG. 6, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
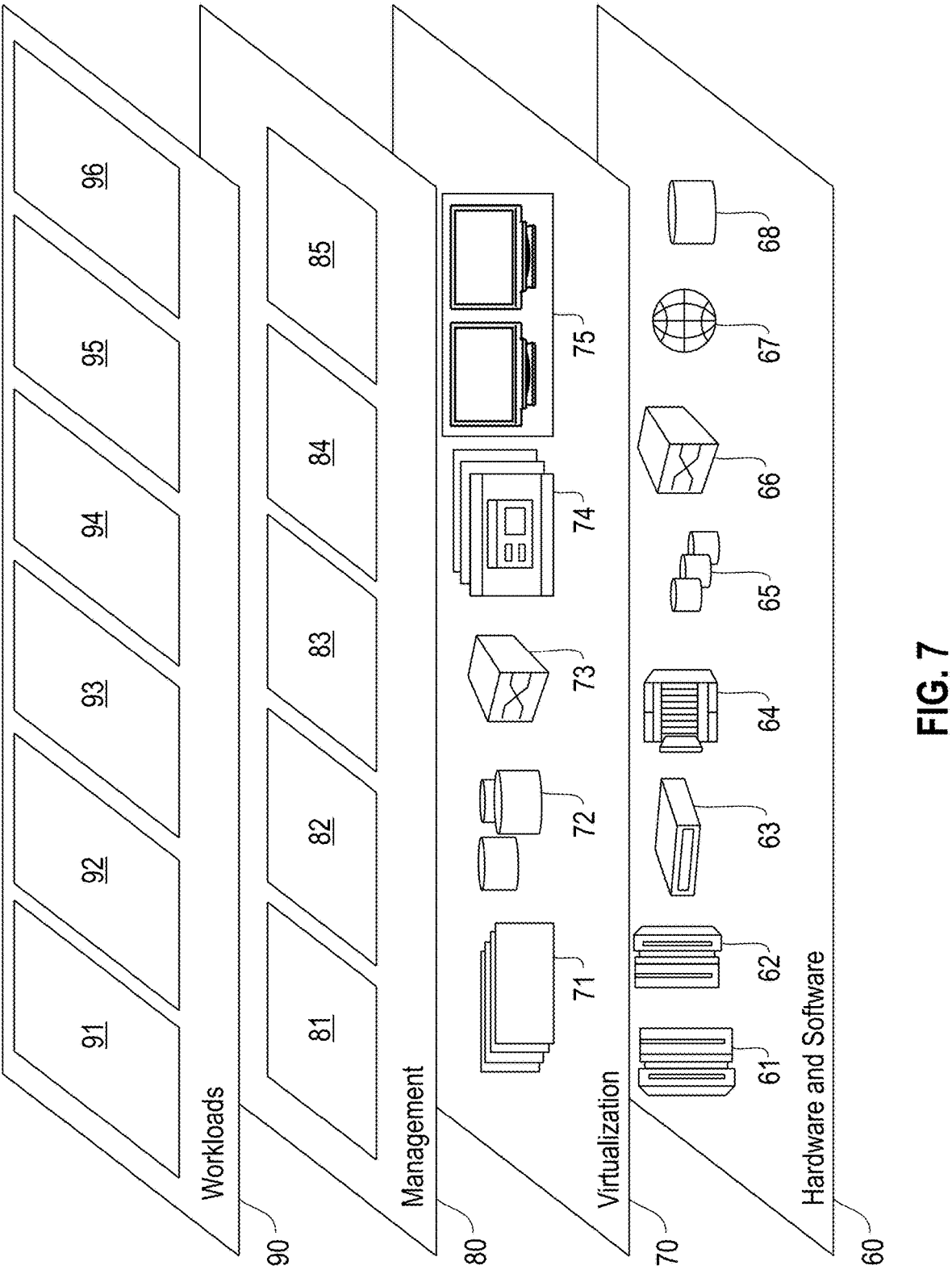
FIG. 7 depicts a set of abstraction model layers, according to an embodiment.

Referring now to FIG. 7, a set of functional abstraction layers provided by the cloud computing environment 50 (FIG. 6) is shown. It should be understood in advance that the components, layers, and functions shown in FIG. 7 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for cross-domain structural mapping processing 96 (see, e.g., system 500, FIG. 10, a ML model architecture 900 for cross-domain structural mapping, FIG. 4), and process 1000, FIG. 5). As mentioned above, all of the foregoing examples described with respect to FIG. 7 are illustrative only, and the embodiments are not limited to these examples.

It is reiterated that although this disclosure includes a detailed description on cloud computing, implementation of the teachings recited herein are not limited to a cloud computing environment. Rather, the embodiments may be implemented with any type of clustered computing environment now known or later developed.

Figure 8:
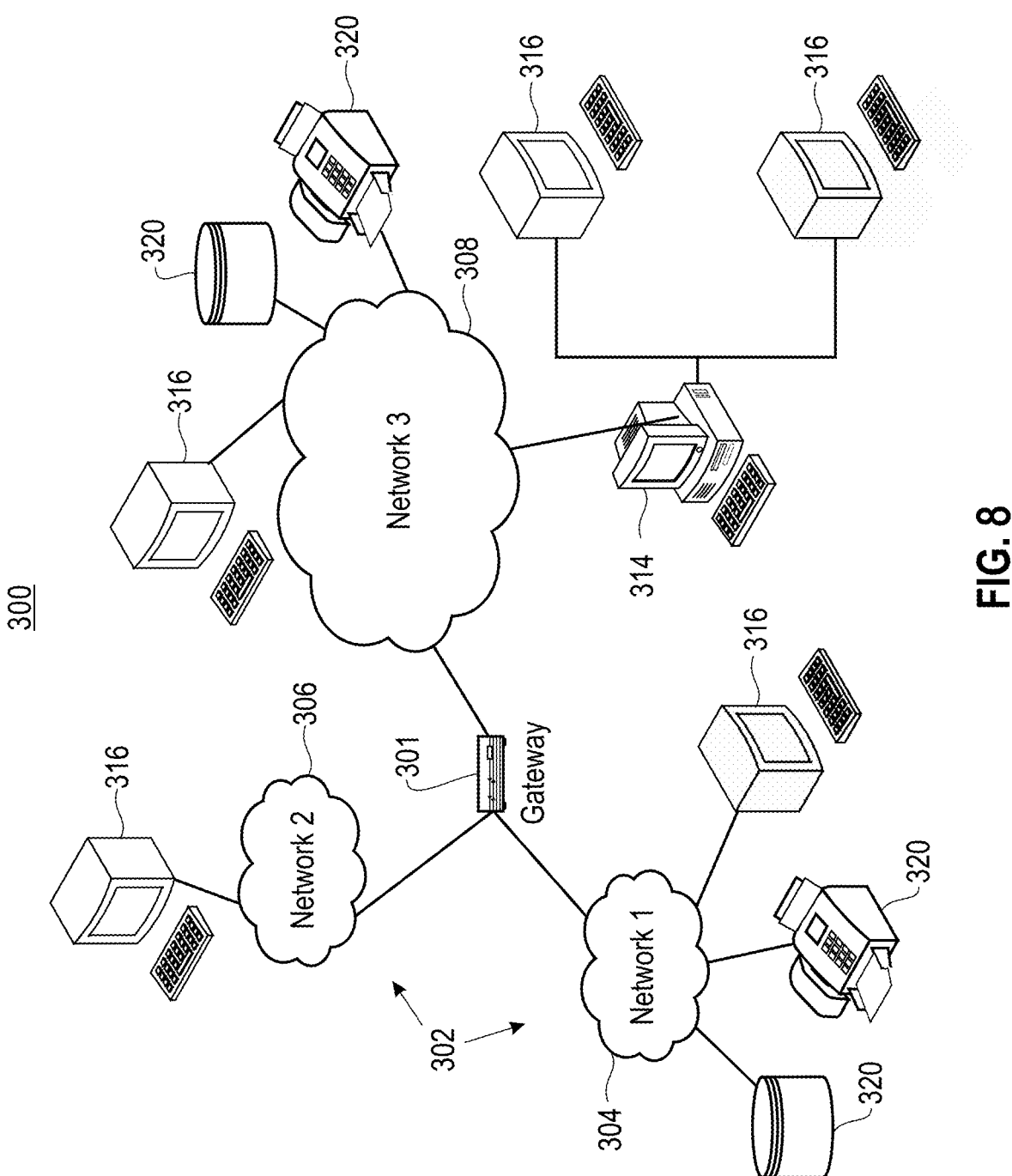
FIG. 8 is a network architecture of a system for cross-domain structural mapping, according to an embodiment.

FIG. 8 is a network architecture of a system 300 for cross-domain structural mapping, according to an embodiment, according to an embodiment. As shown in FIG. 8, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 316 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX® system that emulates an IBM® z/OS environment, a UNIX® system that virtually hosts a MICROSOFT® WINDOWS® environment, a MICROSOFT® WINDOWS® system that emulates an IBM® z/OS environment, etc. This virtualization and/or emulation may be implemented through the use of VMWARE® software in some embodiments.

Figure 9:
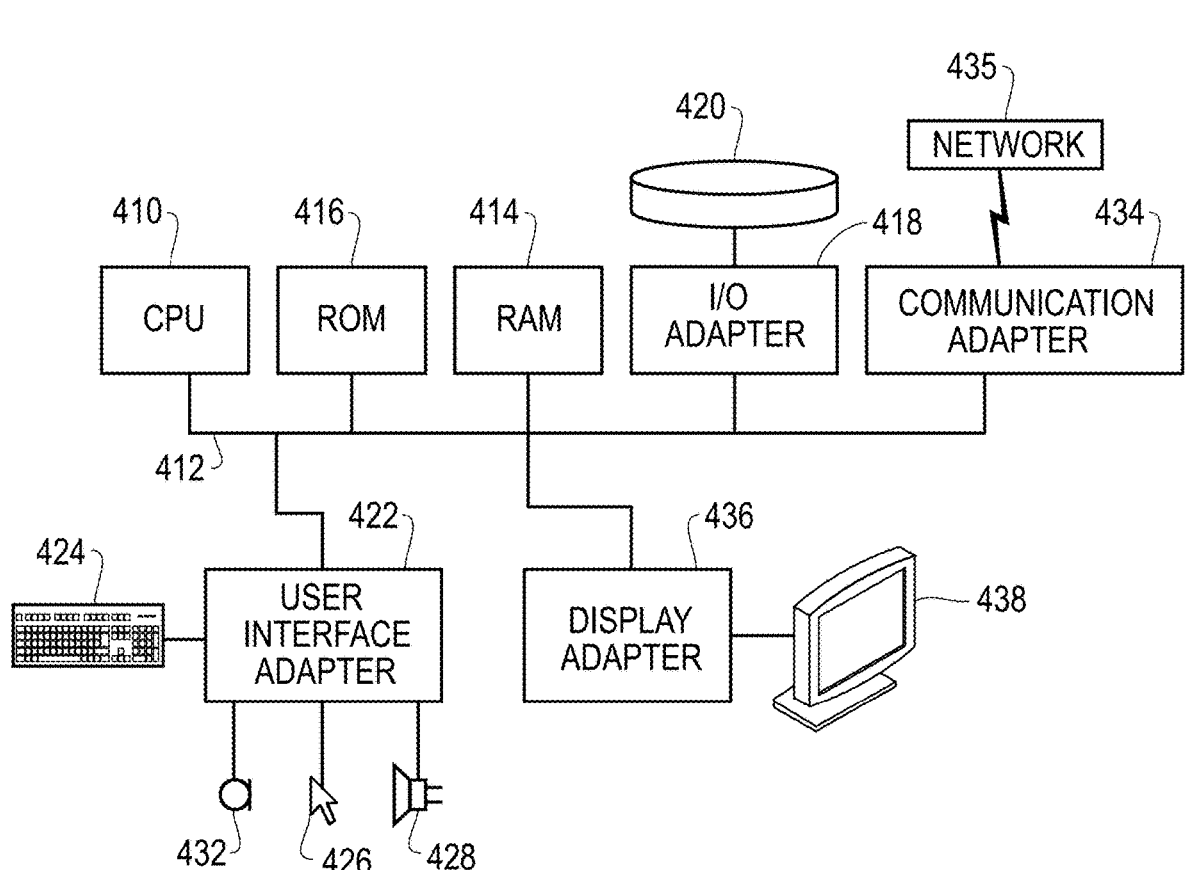
FIG. 9 shows a representative hardware environment that may be associated with the servers and/or clients of FIG. 6, according to an embodiment.

FIG. 9 shows a representative hardware system 400 environment associated with a user device 316 and/or server 314 of FIG. 8, in accordance with one embodiment. In one example, a hardware configuration includes a workstation having a central processing unit 410, such as a microprocessor, and a number of other units interconnected via a system bus 412. The workstation shown in FIG. 9 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT® WINDOWS® Operating System (OS), a MAC OS®, a UNIX® OS, etc. In one embodiment, the system 400 employs a POSIX® based file system. It will be appreciated that other examples may also be implemented on platforms and operating systems other than those mentioned. Such other examples may include operating systems written using JAVA®, XML, C, and/or C++ language, or other programming languages, along with an object oriented programming methodology. Object oriented programming (OOP), which has become increasingly used to develop complex applications, may also be used.

Figure 10:
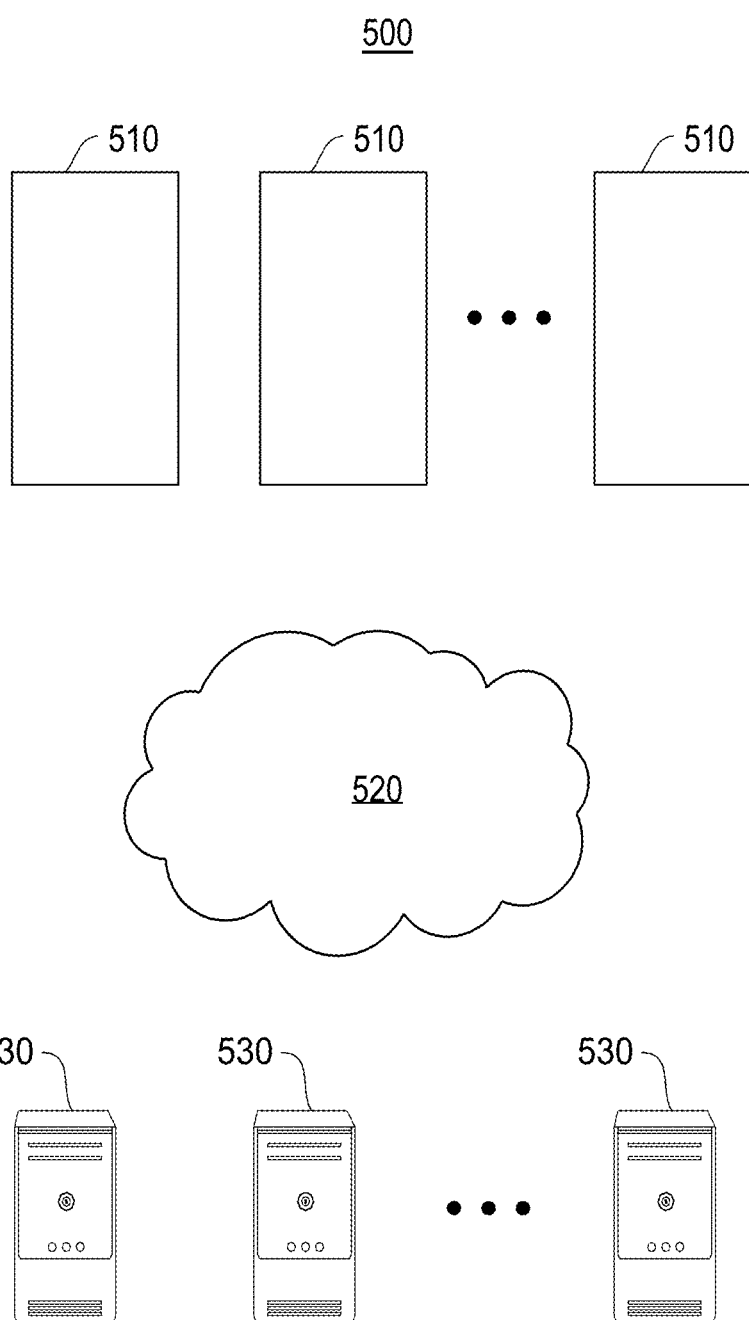
FIG. 10 is a block diagram illustrating a distributed system for cross-domain structural mapping, according to one embodiment.

FIG. 10 is a block diagram illustrating a distributed system 500 for cross-domain structural mapping, according to one embodiment. In one embodiment, the system 500 includes client devices 510 (e.g., mobile devices, smart devices, computing systems, etc.), a cloud or resource sharing environment 520 (e.g., a public cloud computing environment, a private cloud computing environment, a data center, etc.), and servers 530. In one embodiment, the client devices 510 are provided with cloud services from the servers 530 through the cloud or resource sharing environment 520.

One or more embodiments may be a system, a method, and/or a computer program product at any possible technical detail level of integration. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated.

What is claimed is:

1. A method of using a computing device executing to interrelate two or more domain corpuses of dissimilar data, the method comprising:

receiving input data from each of two or more domain corpuses of dissimilar data;

computing, by the computing device, a pass for each of the input data;

training, based on the pass for each of the input data, two or more encoder-decoder models selected from convolutional neural networks, recurrent neural networks, long short-term memory networks, self-attention networks;

obtaining, by the computing device, a prediction of an identity mapping for each of different domains of knowledge from each of the two or more encoder-decoder models;

computing, but the computing device, a pairwise mean relative living time (MRLT) distribution distance metric based on persistence intervals of simplicial complexes derived from low-dimensional embedding vector representations from each of the two or more encoder models;

computing, by the computing device, a joint loss function based on each of the predictions from each of the two or more encoder-decoder models and the distribution distance metrics;

updating, by the computing device, based on results of the joint loss function, the training of the two or more encoder-decoder models, wherein the training comprises using backpropagation to minimize a reconstruction loss;

determining, using an epsilon parameter, a ball radius to determine a representation of the simplicial complexes of an intra-domain relationship to perform mappings across inter-domain relationships;

learning, by the two or more encoder-decoder models, how to reconstruct the data from encoded representations based on a number of holes and connected components relative to the ball radius; and determining, using the updated two or more encoder-decoder models and the ball radius, a cross-domain structural mapping interrelating dissimilar data of the two or more encoder-decoder models, wherein the cross-domain structural mapping improves computational efficiency in reconciling heterogeneous corpuses by reducing reconstruction error and preserving topological representations across domains.

2. The method of claim 1, further comprising:

computing, by the computing device, a corresponding reconstruction loss for each of the two or more encoder-decoder models using the respective prediction and the input data from each of the two or more domain corpuses of dissimilar data; and extracting, by the computing device, a low-dimensional embedding vector of input data representations from each of the two or more encoder-decoder model.

3. The method of claim 2, wherein the distribution distance metric is a pairwise mean relative living times (MRLT) distribution distance metric, and the function is a joint loss function.

4. The method of claim 3, further comprising:

computing, by the computing device, a gradient of a loss from the joint loss function with respect to model parameters for each of the two or more encoder-decoder models.

5. The method in claim 4, further comprising:

initializing, by the computing device, weights for each of the two or more encoder-decoder models;

performing, by the computing device, preprocessing, transforming and extracting of the input data into a fixed-dimension feature vector;

performing, by the computing device, feed forward processing for a feedforward pass for each intra-domain sample of the input data into each respective one of the two or more encoder-decoder models;

generating, by the computing device, corresponding output predictions for each of the intra-domain samples of the input data using each respective one of the two or more encoder-decoder models; and computing, by the computing device, a corresponding loss value with respect to the joint loss function for each of the two or more encoder-decoder models given the intra-domain samples of the input data and the corresponding output predictions.

6. The method in claim 4, further comprising:

computing, by the computing device, the pairwise MRLT distribution distance metrics based on a first relative living times (RLT) matrix and a second RLT matrix between each intra-domain samples of the input data and based on using a distance of a distribution the two relative living time metrics defined between the first RLT matrix and the second RLT matrix.

7. The method in claim 4, further comprising:

computing, by the computing device, the pairwise MRLT distribution distance metrics based on a first relative living times (RLT) matrix and a second RLT matrix between each intra-domain samples of the input data and based on using a squared loss function between output of the first RLT matrix and the second RLT matrix.

8. The method of claim 4, further comprising:

computing, by the computing device, the pairwise MRLT distribution distance metrics based on a first relative living times (RLT) matrix and a second RLT matrix between each intra-domain samples of the input data and based on using a Wasserstein distance determination of a distribution the first RLT matrix and the second RLT matrix.

9. The method of claim 1, wherein the two or more domain corpuses of dissimilar data comprise text, images, audio, and other data sources in different domains of knowledge.

10. A computer program product for interrelating two or more domain corpuses of dissimilar data, the computer program product comprising a computer readable storage medium having program instructions embodied therewith, the program instructions executable by a processor to cause the processor to:

Receive, by the processor, input data from each of two or more domain corpuses of dissimilar data;

compute, by the processor, a pass for each of the input data;

train, based on the pass for each of the input data, two or more encoder-decoder models selected from convolutional neural networks, recurrent neural networks, long short-term memory networks, self-attention networks;

obtain, by the processor, a prediction of an identity mapping for each of different domains of knowledge from each of the two or more encoder-decoder models;

compute, by the processor, a pairwise mean relative living time (MRLT) distribution distance metric based on persistence intervals of simplicial complexes derived from low-dimensional embedding vector representations from each of the two or more encoder models;

compute, by the processor, a joint loss function based on each of the predictions from each of the two or more encoder-decoder models and the distribution distance metrics;

update, by the processor based on results of the joint loss function, the training of the two or more encoder-decoder models, wherein the training comprises using backpropagation to minimize a reconstruction loss;

determine, using an epsilon parameter, a ball radius to determine a representation of the simplicial complexes of an intra-domain relationship to perform mappings across inter-domain relationships;

learn, by the two or more encoder-decoder models, how to reconstruct the data from encoded representations based on a number of holes and connected components relative to the ball radius; and determine, using the updated two or more encoder-decoder models and the ball radius, a cross-domain structural mapping interrelating dissimilar data of the two or more encoder-decoder models, wherein the cross-domain structural mapping improves computational efficiency in reconciling heterogeneous corpuses by reducing reconstruction error and preserving topological representations across domains.

11. The computer program product of claim 10, wherein:

the program instructions executable by the processor further cause the processor to:

compute, by the processor, a corresponding reconstruction loss for each of the two or more encoder-decoder models using the respective prediction and the input data from each of the two or more domain corpuses of dissimilar data; and extract, by the processor, a low-dimensional embedding vector of input data representations from each of the two or more encoder-decoder model; and the two or more domain corpuses of dissimilar data comprise text, images, audio, and other data sources in different domains of knowledge.

12. The computer program product of claim 11, wherein the program instructions executable by the processor further cause the processor to:

compute, by the processor, a gradient of a loss from the joint loss function with respect to model parameters for each of the two or more encoder-decoder models;

wherein the distribution distance metric is a pairwise mean relative living times (MRLT) distribution distance metric, and the function is a joint loss function.

13. The computer program product of claim 12, wherein the program instructions executable by the processor further cause the processor to:

initialize, by the processor, weights for each of the two or more encoder-decoder models;

perform, by the processor, preprocessing, transforming and extracting of the input data into a fixed-dimension feature vector;

perform, by the processor, feed forward processing for a feedforward pass for each intra-domain sample of the input data into each respective one of the two or more encoder-decoder models;

generate, by the processor, corresponding output predictions for each of the intra-domain samples of the input data using each respective one of the two or more encoder-decoder models; and compute, by the processor, a corresponding loss value with respect to the joint loss function for each of the two or more encoder-decoder models given the intra-domain samples of the input data and the corresponding output predictions.

14. The computer program product of claim 12, wherein the program instructions executable by the processor further cause the processor to:

compute, by the processor, the pairwise MRLT distribution distance metrics based on a first relative living times (RLT) matrix and a second RLT matrix between each intra-domain samples of the input data and based on using a distance of a distribution the two relative living time metrics defined between the first RLT matrix and the second RLT matrix.

15. The computer program product of claim 12, wherein the program instructions executable by the processor further cause the processor to:

compute, by the processor, the pairwise MRLT distribution distance metrics based on a first relative living times (RLT) matrix and a second RLT matrix between each intra-domain samples of the input data and based on using a squared loss function between output of the first RLT matrix and the second RLT matrix.

16. The computer program product of claim 12, wherein the program instructions executable by the processor further cause the processor to:

compute, by the processor, the pairwise MRLT distribution distance metrics based on a first relative living times (RLT) matrix and a second RLT matrix between each intra-domain samples of the input data and based on using a Wasserstein distance determination of a distribution the first RLT matrix and the second RLT matrix.

17. An apparatus comprising:

a memory configured to store instructions; and a processor configured to execute the instructions to:

receive input data from each of two or more domain corpuses of dissimilar data;

compute, by the processor, a pass for each of the input data;

train, based on the pass for each of the input data, two or more encoder-decoder models selected from convolutional neural networks, recurrent neural networks, long short-term memory networks, self-attention networks;

obtain a prediction of an identity mapping for each of different domains of knowledge from each of the two or more encoder-decoder models;

compute a pairwise mean relative living time (MRLT) distribution distance metric based on persistence intervals of simplicial complexes derived from low-dimensional embedding vector representations from each of the two or more encoder models;

compute a joint loss function based on each of the predictions from each of the two or more encoder-decoder models and the distribution distance metrics;

update, based on results of the joint loss function, the training of the two or more encoder-decoder models, wherein the training comprises using backpropagation to minimize a reconstruction loss;

determine, using an epsilon parameter, a ball radius to determine a representation of the simplicial complexes of an intra-domain relationship to perform mappings across inter-domain relationships;

learn, by the two or more encoder-decoder models, how to reconstruct the data from encoded representations based on a number of holes and connected components relative to the ball radius; and determine, using the updated two or more encoder-decoder models and the ball radius, a cross-domain structural mapping interrelating dissimilar data of the two or more encoder-decoder models, wherein the cross-domain structural mapping improves computational efficiency in reconciling heterogeneous corpuses by reducing reconstruction error and preserving topological representations across domains.

18. The apparatus of claim 17, wherein:

the processor is further configured to execute the instructions to:

compute a corresponding reconstruction loss for each of the two or more encoder-decoder models using the respective prediction and the input data from each of the two or more domain corpuses of dissimilar data; and extract a low-dimensional embedding vector of input data representations from each of the two or more encoder-decoder model; and the two or more domain corpuses of dissimilar data comprise text, images, audio, and other data sources in different domains of knowledge.

19. The apparatus of claim 18, wherein:

the processor is further configured to execute the instructions to:

compute a gradient of a loss from the joint loss function with respect to model parameters for each of the two or more encoder-decoder models; and the distribution distance metric is a pairwise mean relative living times (MRLT) distribution distance metric, and the function is a joint loss function.

20. The apparatus of claim 19, wherein the processor is further configured to execute the instructions to:

initialize weights for each of the two or more encoder-decoder models;

perform preprocessing, transforming and extracting of the input data into a fixed-dimension feature vector;

perform feed forward processing for a feedforward pass for each intra-domain sample of the input data into each respective one of the two or more encoder-decoder models;

generate corresponding output predictions for each of the intra-domain samples of the input data using each respective one of the two or more encoder-decoder models;

compute a corresponding loss value with respect to the joint loss function for each of the two or more encoder-decoder models given the intra-domain samples of the input data and the corresponding output predictions;

compute the pairwise MRLT distribution distance metrics based on a first relative living times (RLT) matrix and a second RLT matrix between each of the intra-domain samples of the input data and based on one or more of:

using a distance of a distribution the two relative living time metrics defined between the first RLT matrix and the second RLT matrix;

using a squared loss function between output of the first RLT matrix and the second RLT matrix; or using a Wasserstein distance determination of a distribution the first RLT matrix and the second RLT matrix.

* * * * *